US008066480B2

(12) United States Patent
Madsen (10) Patent No.: US 8,066,480 B2
(45) Date of Patent: Nov. 29, 2011

(54) HIGH VOLUME LOW SPEED FAN

(75) Inventor: Joe E Madsen, Leominster, MA (US)

(73) Assignee: AirMotion Sciences, Inc., Holliston, MA (US)

( * ) Notice: Subject to any disclaimer, the term of this patent is extended or adjusted under 35 U.S.C. 154(b) by 572 days.

(21) Appl. No.: 12/291,294

(22) Filed: Nov. 7, 2008

(65) Prior Publication Data

US 2009/0123284 A1  May 14, 2009

Related U.S. Application Data

(60) Provisional application No. 61/002,488, filed on Nov. 9, 2007.

(51) Int. Cl.
*F04D 29/18* (2006.01)
*F04D 29/26* (2006.01)
*B63H 3/00* (2006.01)
*B64C 11/00* (2006.01)
*B64C 27/00* (2006.01)
*F03B 7/00* (2006.01)

(52) U.S. Cl. .................. 416/38; 416/5; 416/32; 416/36; 416/162; 416/155; 310/92

(58) Field of Classification Search ............... 416/5, 32, 416/36, 38, 39, 139, 155, 157 R, 162, 165, 416/169 A, 205, 223 R; 310/92, 105; 192/84.1; 362/96, 234

See application file for complete search history.

(56) References Cited

U.S. PATENT DOCUMENTS

| | | | |
|---|---|---|---|
| 1,309,005 A | 7/1919 | Weatherly | |
| 1,491,589 A | 4/1924 | Dzus | |
| 2,152,983 A | 4/1939 | Wilford | |
| 2,225,209 A | 12/1940 | Dewey | |
| 2,478,244 A | 8/1949 | Cooley | |
| 3,169,582 A | 2/1965 | Schilder et al. | |
| 4,621,992 A * | 11/1986 | Angott | 417/572 |
| 5,281,095 A | 1/1994 | Komura et al. | |
| 5,462,412 A * | 10/1995 | Scofield et al. | 416/210 R |
| 5,549,455 A * | 8/1996 | Speer | 416/93 A |
| 5,668,920 A * | 9/1997 | Pelonis | 392/361 |
| 5,685,694 A | 11/1997 | Jones | |
| 5,779,446 A | 7/1998 | Althof et al. | |
| 5,899,663 A * | 5/1999 | Feder et al. | 416/5 |

(Continued)

OTHER PUBLICATIONS

AirMotion Sciences Inc.—AltAir HVLS Fan Brochure—copyright 2008.

*Primary Examiner* — Chris Chu
(74) *Attorney, Agent, or Firm* — Scott Lefton (57) ABSTRACT

A high volume low speed (HVLS) fan provides improved air circulation and thermal control in a building by incorporating composite fan blades pivotable to both positive and negative pitch angles. The blades are molded of polymer material over a metal tube core for strength and ease of attachment to the fan hub, and have a symmetrical airfoil shape to produce an efficient bi-directional conical airflow. The fan includes a control unit providing manual and automated intelligent control over blade angle and rotational speed, as well as startup with approximately zero blade angle for more economical power consumption and less motor wear. The fan structure and mounting system allows the fan to be installed at an optimal height inside a variety of buildings to provide increased efficiency of air destratification and air mixing. An array of multiple HVLS fans with alternating directions of airflow can further increase efficiency of air movement.

25 Claims, 7 Drawing Sheets

U.S. PATENT DOCUMENTS

| | | | |
|---|---|---|---|
| 6,155,786 A * | 12/2000 | Blateri et al. | 416/206 |
| 6,244,821 B1 | 6/2001 | Boyd | |
| 6,382,917 B1 * | 5/2002 | Zuege | 416/210 R |
| 6,517,316 B1 * | 2/2003 | Gajewski | 416/5 |
| 6,548,929 B2 * | 4/2003 | Nelson et al. | 310/105 |
| 6,589,016 B2 | 7/2003 | Boyd | |
| 6,817,835 B2 | 11/2004 | Boyd | |
| 6,838,796 B1 * | 1/2005 | Nelson | 310/105 |
| 6,939,108 B2 * | 9/2005 | Boyd | 416/237 |
| 7,066,721 B2 * | 6/2006 | Bird | 417/423.8 |
| 7,795,769 B2 * | 9/2010 | Cartwright et al. | 310/89 |
| 7,914,260 B2 * | 3/2011 | Pearce | 416/205 |

* cited by examiner

HIGH VOLUME LOW SPEED FAN

CROSS REFERENCE TO RELATED APPLICATIONS

I claim the benefit of the priority date of Provisional Patent Application No. 61/002,488 filed Nov. 9, 2007 entitled HIGH VOLUME LOW SPEED FAN.

STATEMENT REGARDING FEDERALLY SPONSORED RESEARCH OR DEVELOPMENT

N/A

BACKGROUND OF THE INVENTION

1. Field of the Invention

The present invention relates generally to rotary fans with elongated blades configured to move large volumes of air at low rotational speeds. This type of fan is usually configured to be mounted with the blades in a horizontal plane and above the area where most of the air moving is to occur, and is generally referred to as a high volume low speed (HVLS) fan.

2. Description of the Prior Art

A high volume low speed fan will generally have at least 6 blades, in the majority of cases each blade being at least 4 feet in length. A primary use for HVLS fans is to move air for ventilation, temperature control and cooling of people and livestock in large, relatively open buildings without causing strong air currents that may disrupt work and stir up dust. An example of an HVLS fan is taught by U.S. Pat. No. 6,244,821 entitled LOW SPEED COOLING FAN. This fan uses blades with an airfoil cross-section to produce a slowly downwards-moving column of air with a minimal lateral component. The blades are formed from an aluminum extrusion with an added tapered flap fastened to the extrusion to improve the airflow characteristics.

U.S. Pat. No. 6,589,016 also entitled LOW SPEED COOLING FAN is a continuation of the '821 patent and teaches a further permutation of fan blade shape and length.

U.S. Pat. No. 6,817,835 also entitled LOW SPEED COOLING FAN is a continuation of the '016 patent, covering essentially the same invention as the '016 patent.

U.S. Pat. No. 6,939,108 entitled COOLING FAN WITH REINFORCED BLADE teaches a further version of the HVLS fan blades described in the '821, '016 and '835 patents, in particular providing the innovation of a reinforcing flange whose purposes are disclosed to be increased structural rigidity, increased downward thrust during rotation and overcoming some of the manufacturing difficulties inherent in the production of long extruded metal fan blades with a trailing edge.

The HVLS fans taught by the '821, '016, '835 and '108 patents all share several characteristics, having extruded aluminum blades with an airfoil cross-section optimized for a single direction of airflow and producing an airflow consistently described as columnar or cylindrical, with intentionally minimized lateral airflow components and an airspeed limited to the range of 3-5 mph. Further, the fans are consistently taught as being configured to be mounted to the roof or ceiling of the building where they are to be used. Additionally, the '821 and '016 patents teach a constant mounting angle of 8 degrees for the blades in order to achieve optimal airflow at air speeds in the range of 3 to 5 mph. The '821, '016, '835 and '108 patents also teach the use of the HVLS fans for circulating air in industrial buildings, cooling industrial buildings, and cooling individuals in industrial buildings.

There are several disadvantages to the fans taught by the '821, '016, '835 and '108 patents. Extruded fan blades are inherently limited in contour variation along their length by the nature of the manufacturing process and may require considerable and expensive post-processing to have any contour variation. Additionally, the fan blades taught by the '821, '016, '835 and '108 patents all require a separate end cap component, requiring yet more manufacturing and fastening operations. These fan blades are also highly optimized for a single direction of airflow and would not be capable of efficiently producing an upwards airflow, which is very limiting. The blades are also optimized for a particular limited range of mounting angles and for a columnar or cylindrical airflow profile, further limiting the utility of the inventions disclosed therein. In addition, the uses taught by the '821, '016, '835 and '108 patents do not include de-stacking of air thermal layers or general temperature control.

The '821, '016, '835 and '108 patents all teach mounting of the HVLS fan to a ceiling or roof, which limits the general use of the fan and specifically limits some aspects of the airflow by proximity to a surface. This mounting style and the teaching of an airspeed constrained to 3-5 mph even further limit the utility of these inventions.

When a fan starts up, there is a spike in energy use partially caused by air resistance against the blades. The steeper the blade angle, the greater the air resistance and resulting instantaneous energy demand. This spike also can cause long-term damage to the motor itself as well as to the control and drive circuitry. A better approach is to have a fan capable of varying the blade angle to allow startup with a zero or very small angle, and increasing the blade angle automatically once the fan is rotating. Additionally, having the capability to widely vary the blade angle and rotational speed allows for a much greater variety of airflow characteristics, thus permitting the fan to be optimized for a wider range of uses. This more flexible approach to fan use is further improved if the blade is shaped to allow equal but opposite air movement at positive and negative blade angles.

Bi-directional airflow also allows increased capability for the fan to perform de-stacking or destratifying of air layers for increased efficiency and energy savings in both cooling and heating. Having bi-directional airflow capability also allows multiple fans to be configured with mixed or alternating directions of airflow to further optimize the air movement within a building. Optimized air movement includes improved air mixing and heat destratification for more uniform air temperatures, thus enabling a building's heating and air conditioning systems to operate more efficiently.

The columnar or cylindrical airflow taught by the '821, '016, '835 and '108 patents also limits the utility of the HVLS fans. A distinctly conical airflow contour allows more uniform flow of air at the places in the building where people and livestock would actually be. Additionally, mounting HVLS fans to ceilings or roofs is not always desirable, as having the fans spaced more distantly from the ceiling or roof and closer to the middle of the building may allow far better airflow and efficiency of use. Further, a fan designed for more flexible mounting can be used in more locations, and to that end an additional HVLS fan improvement is to have a lower-profile fan body that fits in more locations.

A more capable HVLS fan has blades shaped to permit more versatile and uniform airflow, control to set variable blade angles including the ability to start the fan with approximately zero blade angle and then vary the blade angle continuously during fan use, efficient bi-directional airflow capability, a control unit allowing manual and programmed control over blade angle and rotational speed, and the ability for the fan to be installed at a height inside a variety of buildings where efficiency and degree of desired air movement would be maximized.

A key element of a more capable HVLS fan is the ability to efficiently vary blade angle over a range of at least +/−20 degrees. One way to achieve a variable blade angle is taught by U.S. Pat. No. 1,309,005 entitled ADJUSTABLE RADIATOR FAN which discloses an engine radiator cooling fan with a manually adjustable fan blade pitch angle. The '005 patent teaches a single direction of blade pitch adjustment and manual mechanical actuation of the pitch control via a hand lever, the adjustment mechanism including a sliding actuator shaft within a rotating tubular drive shaft, a disk slotted with an annular groove affixed on the sliding actuator shaft, and fan blades pivotally mounted to a hub with the mounting including crank pins rigidly connected to the blade pivots and engaging the annular groove in the disk. Similar inventions teaching fan or propeller blades pivoted by attached crank pins held within an annular groove on a disk or ring actuated within a rotating tubular drive shaft are taught by U.S. Pat. No. 1,491,589 entitled MOTOR FAN WHEEL, U.S. Pat. No. 2,152,983 entitled WATERCRAFT, U.S. Pat. No. 2,225,209 entitled MOTOR COOLING CONTROL, U.S. Pat. No. 2,478,244 entitled PITCH ADJUSTING MECHANISM FOR PROPELLERS, and U.S. Pat. No. 5,281,095 entitled VARIABLE-PITCH MECHANISM FOR A PROPELLER. The '005, '589, '983, '209, '244 and '095 patents all teach different versions of a generally similar actuation mechanism.

The '589 patent teaches a variable-pitch fan capable of dual directions of blade pitch adjustment that may be either manually or thermostatically actuated, with facility in the manually actuated version for reading the blade pitch angle from a calibrated dial plate located with the actuation control. The '983 patent teaches a manually actuated bell-crank style of mechanism to set the pitch angle of a propeller. The '209 patent teaches a thermostatically actuated mechanism for setting blade pitch angle, including a counteracting spring and only a single direction of pitch angle control. The '244 patent teaches a variable-pitch propeller capable of dual directions of blade pitch adjustment that is manually actuated with a detented hand-lever control, and incorporates a spring in the actuator mechanism to permit propeller blade feathering against excessive back-pressure. The '095 patent teaches a hydraulically actuated sliding grooved ring rather than a grooved disk for controlling blade pitch. In this configuration, the pitch angle control is external to the actual drive shaft, although inside of the housing retaining the propeller blades.

SUMMARY

The HVLS fan described herein provides improved air circulation and thermal control in a building by incorporating fan blades of a more versatile shape, and by providing the ability to vary the blade angles as well as rotational speed. The blades are molded of a composite or polymer material over a metal tube core for strength and ease of attachment to the fan hub, and are made in a symmetrical airfoil shape for efficient bidirectional airflow. The fan includes an intelligent control system allowing startup with approximately zero blade pitch angle for more economical power consumption and less motor wear. The control unit also allows both manual and automated control over blade pitch angle and rotational speed, and the overall fan structure and mounting system allows the unit to be installed at a height inside a variety of buildings where efficiency and degree of desired air movement can be maximized. This adjustability and the conical airflow profile resulting from the blade shape produce more efficient air destratification and air mixing. Multiple HVLS fans with alternating or mixed directions of airflow can further increase efficiency of air movement. The types of buildings where an HVLS fan is suitable for use include factories, warehouses, distribution centers, storage facilities, airplane-hangars and repair buildings, auto maintenance, storage and dealerships, hotel lobbies, retail stores, malls, churches, sports facilities and gymnasiums, dairy barns, animal feed and food storage facilities, food processing centers, poultry barns, livestock facilities, horse stables and riding arenas, barns, military facilities, or any other large building or space within a building where people or animals may benefit from improved air circulation.

Each fan blade terminates at the base of the blade with a tubular socket by which the blade is affixed to a rotatable shaft terminated by an offset crank arm ending in a crank pin. The rotatable shaft is captured in a hollow hub that holds and radially positions the fan blades and the hollow hub is axially rotated to provide fan blade rotation and consequent air movement. Rotation of the hub is produced by a tubular shaft connected axially to the hub, wherein the tubular shaft is rotated via a mechanical connection to a drive motor. Within the hollow hub is a disk with an annular groove that captures the crank pins. The disk is attached to a rod that slides along the same axis as the tubular shaft. Axial movement of the rod via a position control motor and actuation mechanism thereby producing axial movement of the disk causes the crank pins to drive the crank arms thereby rotating the rotatable shafts and thereby changing the angle of the fan blades.

OBJECTS AND FEATURES OF THE INVENTION

It is an object of the present invention to provide an HVLS fan having variable-pitch fan blades capable of moving to both positive and negative pitch angles.

It is a further object of the present invention to provide an HVLS fan allowing both user and automated control of fan rotational speed, blade pitch and thus direction and degree of air movement.

It is yet another object of the present invention to provide an HVLS fan producing a distinctly conical contour of air movement.

It is still another object of the present invention to provide a low-profile fan body and a flexible fan mounting method to allow optimized locating of the fan for air movement purposes.

It is an additional object of the present invention to provide an HVLS fan producing improved air destratification and air mixing.

It is a feature of the present invention to use insert-molded composite or polymer fan blades to economically optimize the fan blade contour.

It is another feature of the present invention that the fan blades are shaped to provide equal air movement when oriented at either positive or negative angles.

It is yet another feature of the present invention that the fan blade pitch angle is approximately zero degrees at startup in order to increase motor efficiency and operating life.

It is still another feature of the present invention to provide increased rotational speed and increased range of volume of air movement while also providing increased power efficiency.

It is an additional feature of the present invention to incorporate programmed controls and an array of sensors to enable manual to fully automatic operation.

It is a further feature of the present invention that multiple fans with opposite or mixed directions of airflow may be arrayed to further increase airflow efficiency in a building.

BRIEF DESCRIPTION OF THE DRAWINGS

The present version of the invention will be more fully understood with reference to the following Detailed Description in conjunction with the drawings of which.

DESCRIPTION OF THE PREFERRED EMBODIMENT AND BEST MODE

The invention described herein is an HVLS fan configured to produce a range of both downward and upward airflows under user and automatic control and with both increased startup energy efficiency and increased ability to de-stack and mix air thermal layers for more efficient temperature control in buildings.

Preferred Embodiment

Figure 1:
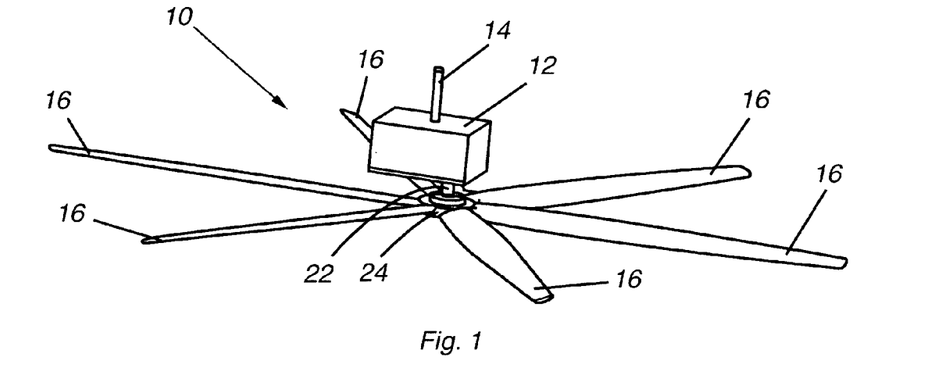
FIG. 1 is an isometric view of the HVLS fan.

FIG. 1 shows the HVLS fan in an embodiment with 6 blades. The fan drive motor is preferably powered by a type of motor drive circuit known as a variable frequency drive, (VFD) preferably mounted with the fan and controlled by a control unit having a portion that is accessible to the user. Note that the VFD is not shown in the Figures and that while the user-accessible portion of the control unit is located at a distance from the fan itself, other portions of the control unit including some sensors and circuitry are located with the fan. The VFD and the line voltage portion of the power electronics are located up in the fan enclosure, which simplifies installation as to wiring, and also provides a safer set-up since only low voltage wiring connections or alternatively remote or networked connections, without the need for costly power wiring and conduit, are necessary to connect to the user-accessible portion of the control unit. The fan 10 is shown with the housing 12 in place, and with a single mounting tube 14 visible in this view. Below the housing 12 is the tubular shaft 22 with the hub assembly 24 attached. The blades 16 are radially positioned around the hub assembly 24.

Figure 2:
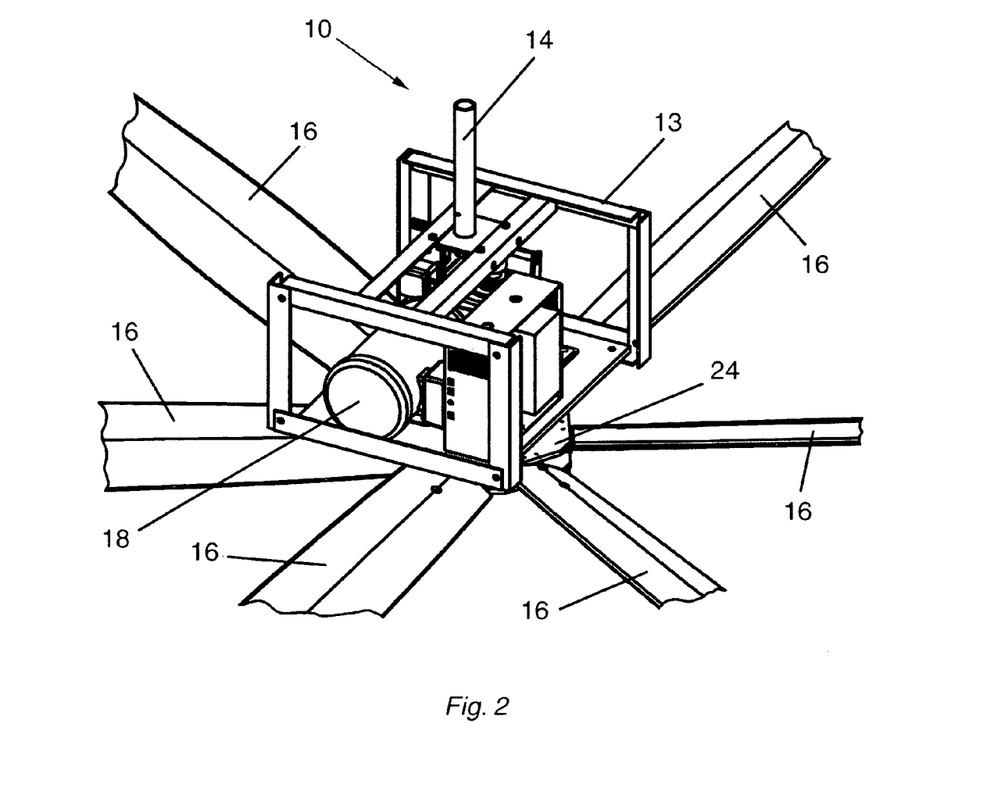
FIG. 2 is an isometric view of the HVLS fan mechanism with the housing removed.

FIG. 2 shows the fan 10 with the housing 12 removed. While a hollow-shaft direct drive system is shown here, a belt and pulley drive system or other drive systems known to those skilled in the art may be employed too.

Figure 3:
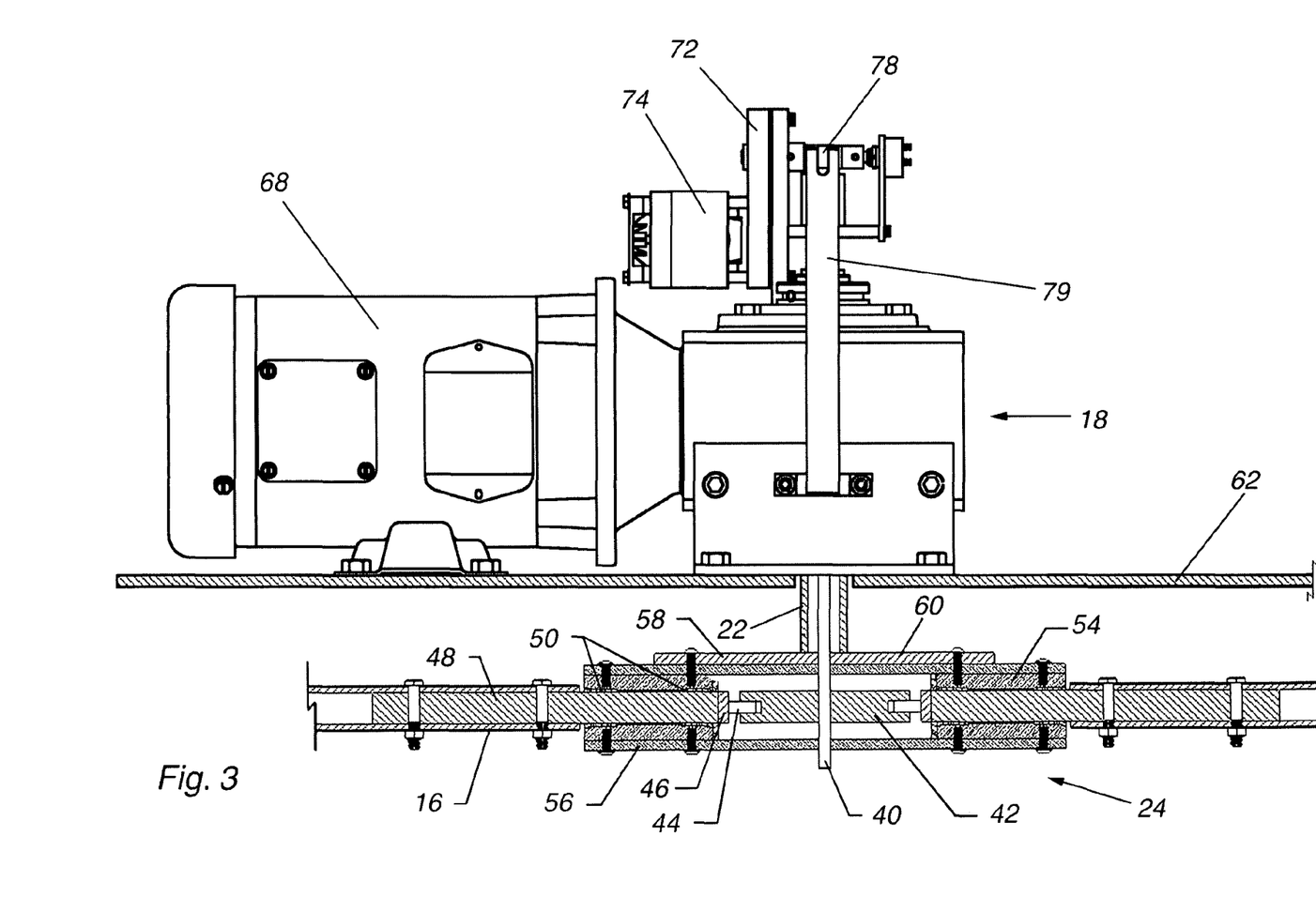
FIG. 3 is an elevation view of the drive assembly with a cross-section through the HVLS fan spindle & hub assembly.
Figure 5:
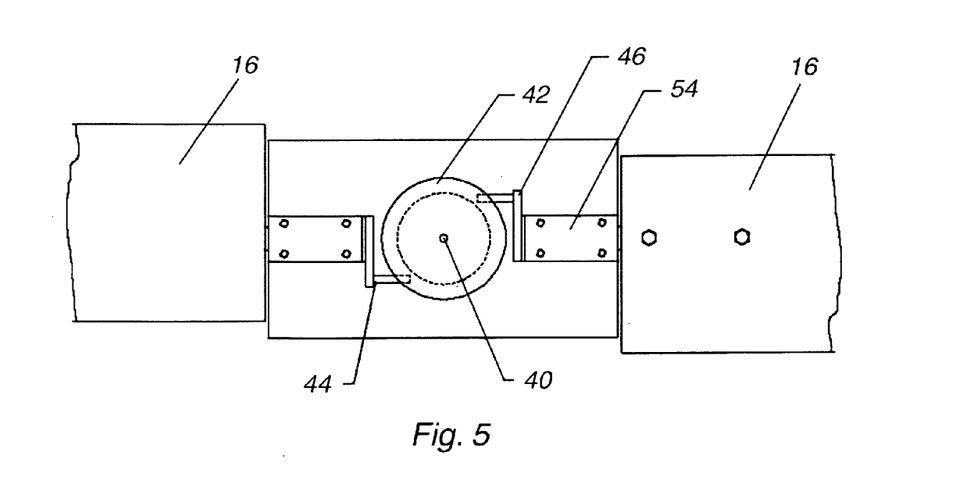
FIG. 5 is a plan view of a section through the crank arm portion of the fan blade pitch changing mechanism.

Referring to FIG. 3, the pitch of the fan blades 16 is changed by the axial movement of pitch control rod 40 that is attached to grooved disk 42. Crank pin 44 is engaged by the grooved disk 42 and drives crank arm 46 to rotate fan blade mounting shaft 48 that is attached to fan blade 16. Refer to FIG. 5 to see a plan view of the crank pin 44, crank arm 46 and grooved disk 42 assembly. Fan blade mounting shaft 48 is captured by bearings 50 that are contained in bearing housing 54. Bearing housing 54 is held in place by the top and bottom hub plates 56 and 58 respectively. A driving flange 60 is attached to tubular shaft 22 and to the hub top plate 58. Tubular shaft 22 is driven by hollow shaft direct drive assembly 18, which is in turn driven by the drive motor 68.

Figure 4:
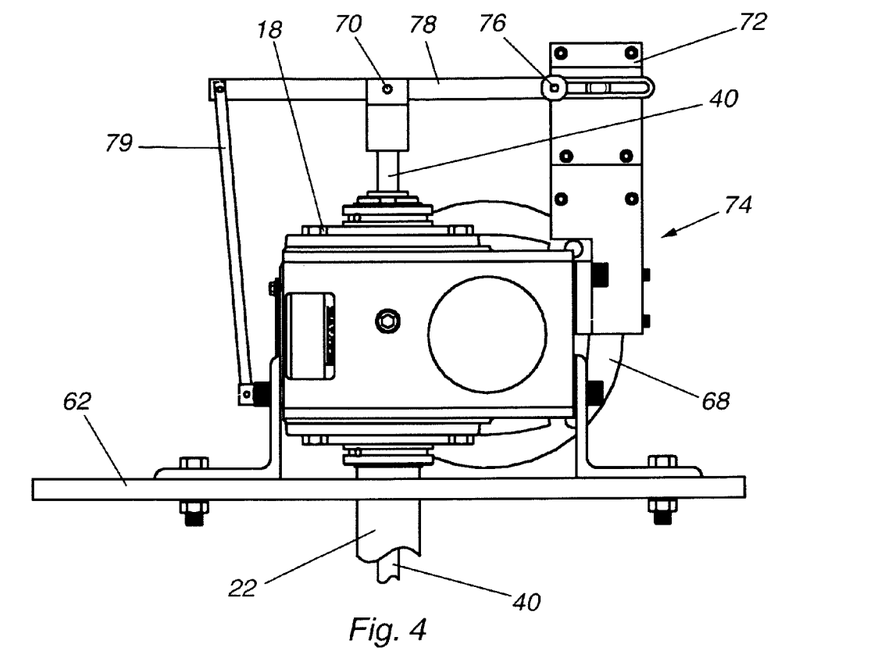
FIG. 4 is an elevation view of the fan blade pitch changing mechanism.

Referring to FIG. 4, the position control motor 74 via the position control gearbox 72 and the crank 76 moves the link assembly consisting of a driving link 78 and a following link 79 such that pin 70 moves the pitch control rod 40 vertically thus changing the pitch of the fan blades 16. With one end of the driving link 78 connected to the crank through a slot and the other end of the driving link 78 connected to one end of the following link 79, and the other end of the following link 79 being appropriately anchored, a mechanical linkage is formed whereby vertical movement is provided to the pitch control rod 40.

Note that for purposes of less cumbersome mechanical description, the hub assembly 24 comprises the bottom hub plate 56, the top hub plate 58, the bearings 50, the bearing housings 54, the driving flange 60 and all associated fasteners. This hub assembly 24 encloses the fan blade mounting shafts 48. The pitch control assembly comprises the position control motor 74, crank 76, driving link 78, following link 79, pitch control rod 40, grooved disk 42, crank pin 44, crank arm 46 and fan blade mounting shaft 48.

Figure 6:
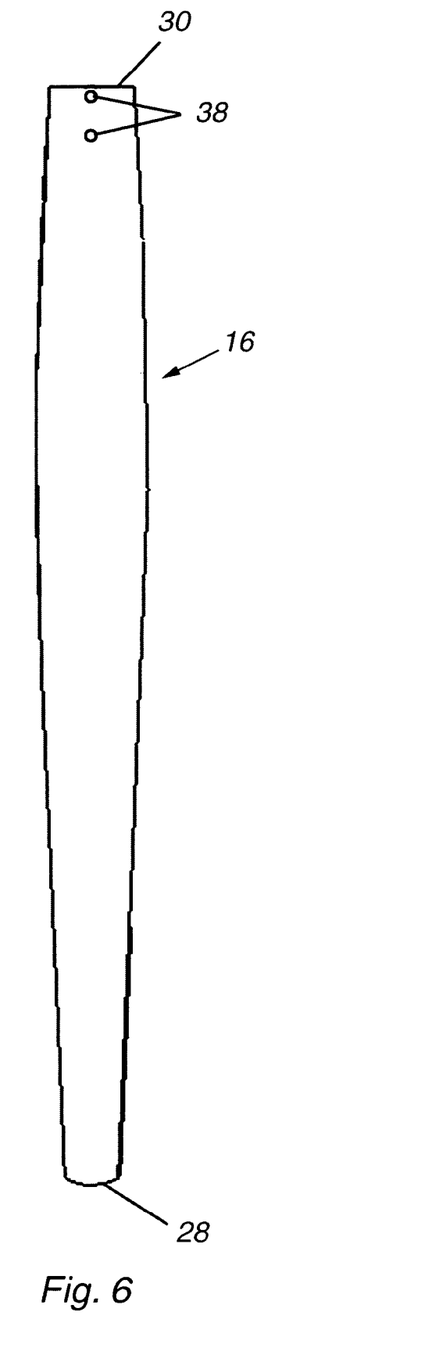
FIG. 6 is a plan view of a fan blade.
Figure 7:
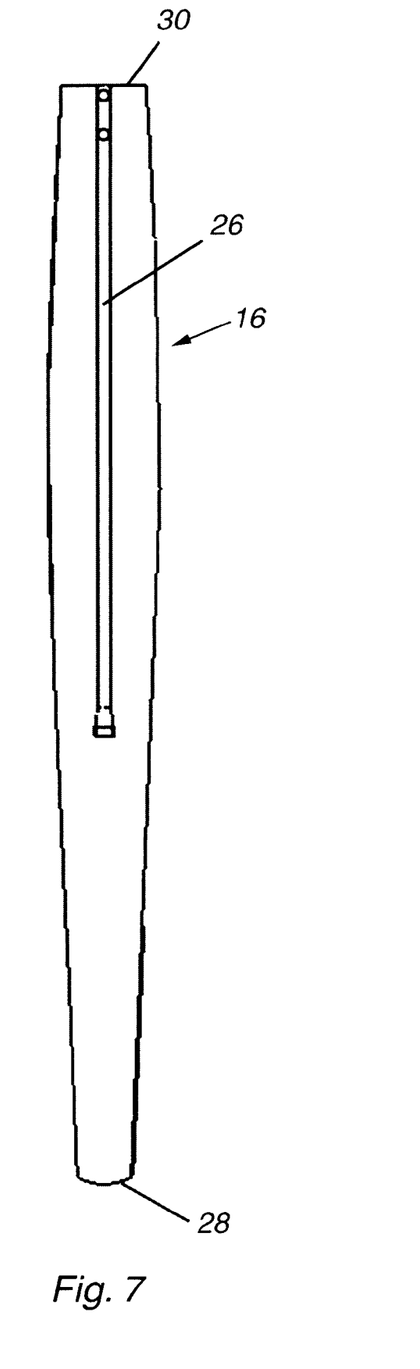
FIG. 7 is a plan view of a section through a fan blade.
Figure 8:
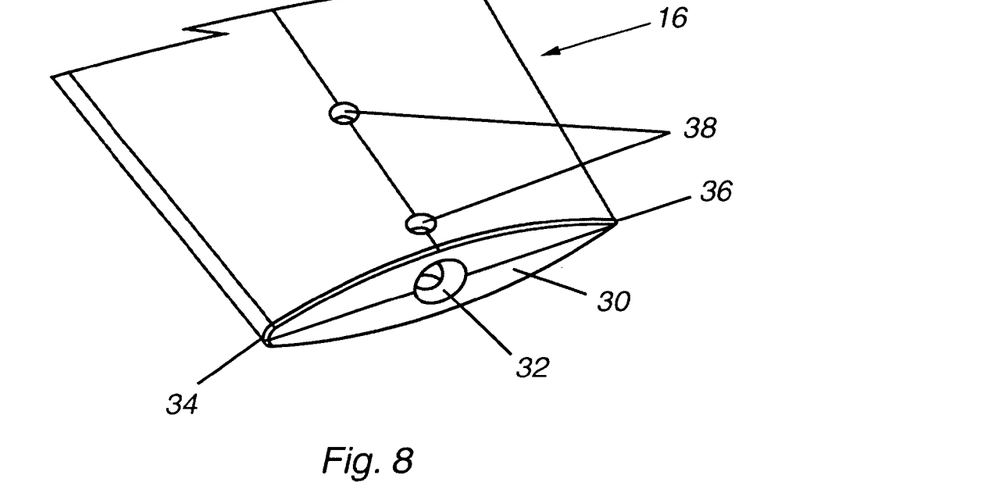
FIG. 8 is an isometric view of the base of a fan blade.
Figure 9:
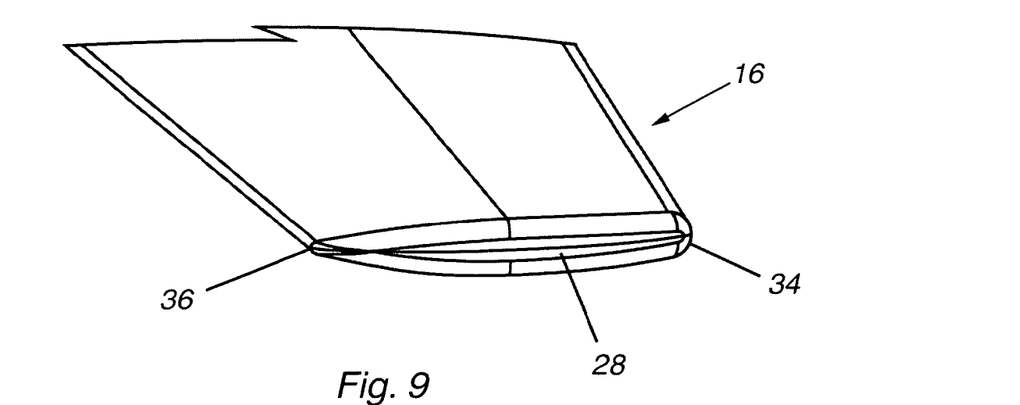
FIG. 9 is an isometric view of the tip of a fan blade.

A typical fan blade 16 is shown in FIG. 6 with a shape that tapers both towards the tip 28 and towards the base 30. The tapering towards the tip provides a more uniform airflow profile, and the tapering towards the base allows a smaller hub for mounting the blades, thereby lowering overall fan weight. FIG. 7 shows a section through the blade 16 including the crimped tube 26 which serves to stiffen the blade 16. The opening of the crimped tube 26 also serves as the blade mounting socket 32 as shown in FIG. 8 along with the other details of the blade base 30. Details of the blade tip 28 are shown in FIG. 9. The blade fastener holes 38 are used preferably with threaded fasteners to fasten the blade 16 to the fan blade mounting shaft 48. FIG. 8 and FIG. 9 also show the blade contours, leading edge 34 and trailing edge 36 at the base 30 and tip 28 respectively.

The fan blade 16 is of polymer or composite construction, preferably nonmetallic and made of reaction injection molded (RIM) urethane formed around a core consisting of a crimped metal tube 36. The length and wall thickness of the tube largely control the blade's stiffness. Preferably, the blade fastener holes 38 are bored in the tube before molding, and along with the blade mounting socket 32 are kept clear of urethane during molding by features within the mold. The RIM process using an insert provides a cost-effective means for accurate forming of a highly contoured fan blade 16. Alternatively, other polymers may be used to form the blade, other materials including carbon fiber may be used to form the tube, materials such as fiberglass or metals such as aluminum may be used to form the blade, and the blade may also be formed without a tube core. The preferred length for the fan blade 16 is from a minimum of approximately 4 feet to a maximum of approximately 15 feet.

The HVLS fan 10 is preferably single-point mounted to overhead beams, trusses or other structural members through a mechanical fastening connection to the mounting tube 14. Alternative 4-point mounting kits or other mounting schemes may be employed too. The control unit 80 is remotely mounted for user access and is in electrical communication with the fan 10 through a cable, a wireless communication link or other means of control communication known to those skilled in the art.

Figure 10:
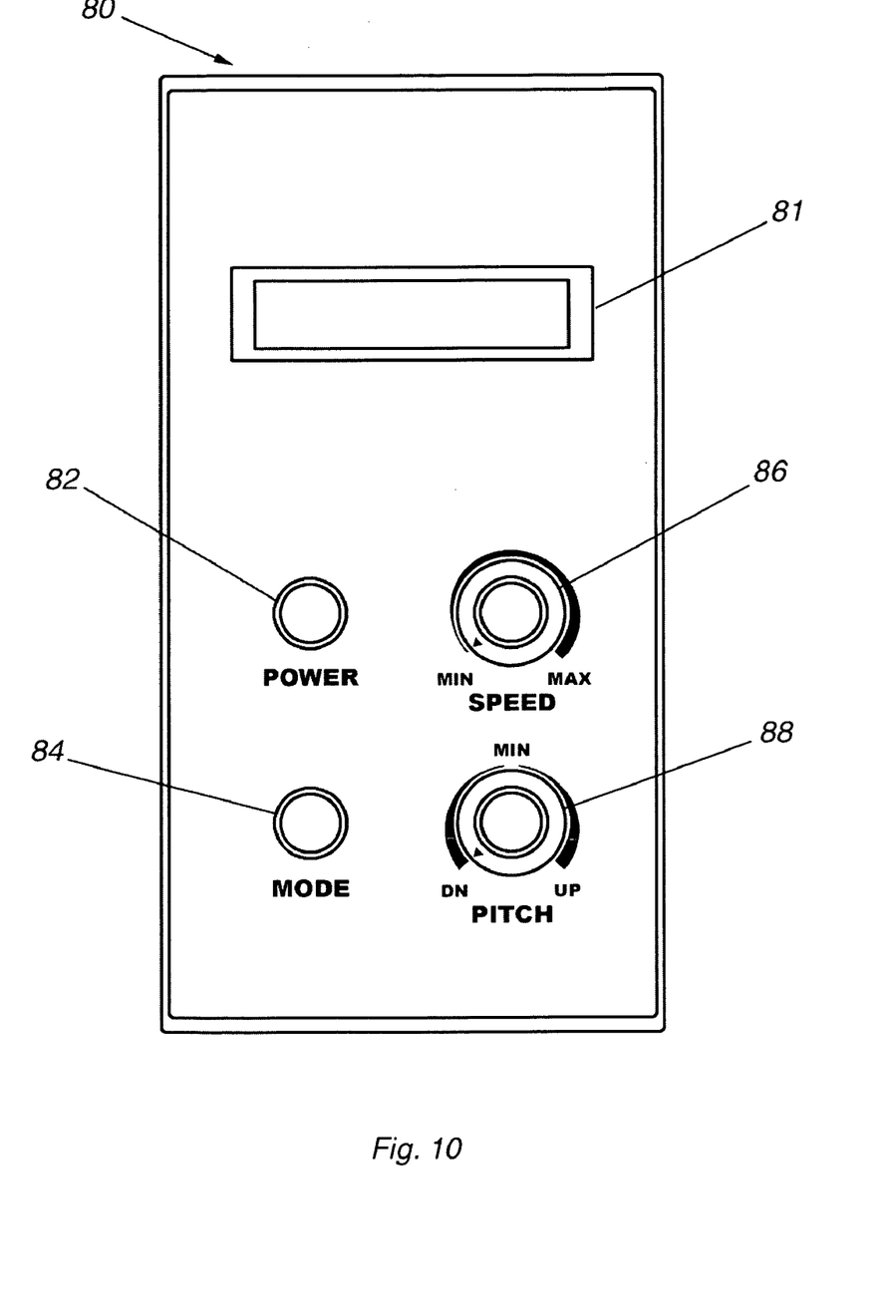
FIG. 10 is an elevation view of the control unit panel.

The fan 10 and control unit 80 are equipped with numerous sensors for parameters including motor speed, blade pitch, temperature at the control unit, temperature at the fan, power usage, and wobble sensors to shut down the fan in the event of a mechanical unbalance condition. As shown in FIG. 10, the control unit 80 has a display 81, a power switch 82, a mode control 84, a fan speed control 86, and a fan blade pitch control 88. The display 81 provides information about fan operation and environmental parameters. The mode control 84 allows the user to select one of several operational modes. A manual mode allows the user to have full direct control over the fan rotation speed and the fan blade pitch. An Eco mode sets the fan blade pitch in response to a user-set rotational speed, thus providing optimized power consumption. A Destrat mode measures the difference in temperature at the fan and the control unit and cycles the fan on and off in response to set temperature difference ranges to destratify the air layers and promote air mixing. An Auto mode measures the difference in temperature at the fan and the control unit and cycles the fan on and off in response to set temperature difference ranges in a manner similar to the Destrat mode, but also runs the fan at varying speeds depending on the magnitude of the temperature difference. An Ext mode provides the option of controlling the fan through external devices such as thermostats, timers, fire suppression shutoffs, and networked connections to computers. In all modes the combination of rotation speed control, fan blade pitch control and the shape of the fan blades serves to provide more uniform air flow plus improved air destratification and air mixing. In many circumstances, this permits the HVLS fan or an array of HVLS fans to supplement or even replace less efficient air conditioning systems. The use of a programmable control unit further enables future enhancement of fan control capabilities by use of the available sensors and controls, plus the possible use of additional external sensors and inputs.

To operate the fan 10, the user presses the power switch 82 to turn the fan unit on. The user also selects the control operating mode by pressing the mode button 84. The mode selected will be shown on the display 81. Once the fan is turned on, the control unit starts the drive motor 68. The drive motor 68 will run at the speed set by the VFD in response to the speed control, approaching full speed by following a drive motor rotational speed profile set by the control unit 80. As the fan 10 comes up to speed, the control unit 80 sets the fan blade 16 pitch to the angle set by the pitch angle control 88. At all times, the fan 10 starts up with the blade pitch at approximately zero pitch, which angle is selected by the fan upon shut down. Both fan speed and blade pitch angle may be changed while the fan is operating. Fan speed is communicated to the control unit 80 via motor speed sensors incorporated into the drive motor 68 and the VFD. Angular position sensing for the blades is communicated to the control unit via a potentiometer connected to the shaft of the position control motor 74. The control unit 80 contains parameters and computing means for calculating the maximum safe fan blade pitch angle versus drive motor speed, and limits the fan blade pitch angle accordingly to prevent motor and fan damage. Airflow direction is controlled by blade pitch angle, where a positive blade pitch angle yields downwards airflow and a negative blade pitch angle yields upwards airflow. If power is lost during operation, the fan blades 16 will remain at the pitch setting prior to power loss. Turning the fan 10 off will not change the present speed and blade pitch settings, but while slowing down to stop, the blade pitch angle is returned to approximately zero degrees. When the fan 10 is next turned on the control unit will use the settings in place at the time the fan was shut off. The maximum practical fan blade pitch angle is approximately +/−20 degrees, and useful ventilating airflow is produced in the range of 0 to 10 mph. The use of composite fan blades permits higher rotational speeds of up to at least 120 rpm for a 15 foot diameter fan. This is more than double the rotational speed of many standard HVLS fans, and in combination with the variable fan blade pitch yields a range of air speed and a volume of airflow greater than standard HVLS fans having diameters of up to 24 feet.

If power loss occurs, the blades 16 will remain at the blade pitch angle setting in place prior to power loss. The blades 16 return to 0 degrees pitch on start up and then the pitch returns to the setting on the control unit as the fan 10 comes up to speed. Alternatively, the blades 16 may be set to have a starting angle other than 0 degrees under some or all use conditions.

The fan is thus able to provide air movement over an angular range of up to approximately 360 degrees, with this adjustable air movement allowing control over the air movement contour between primarily conical to primarily columnar in shape.

Figure 11:
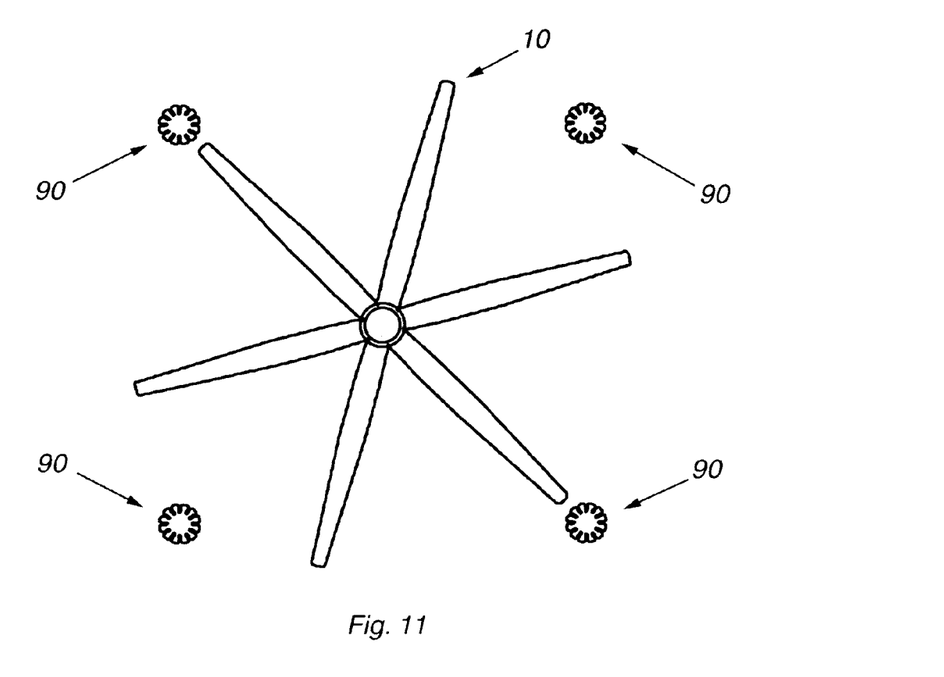
FIG. 11 is a plan view of a fan installed on a beam clearing sprinkler heads and lights.

A further advantage of the low-profile construction of this HVLS fan is that it can be mounted between lights and sprinkler heads 90 as shown in FIG. 11. The standard center distance for sprinkler heads 90 is 12 feet, which allows a fan of up to 15 feet total diameter to be safely used without obstruction. This allows increased flexibility in mounting the fan in confined spaces and attachment to a greater variety of building support structures, thus permitting the lower mounting of the fan and more control over the airflow patterns.

Figure 12:
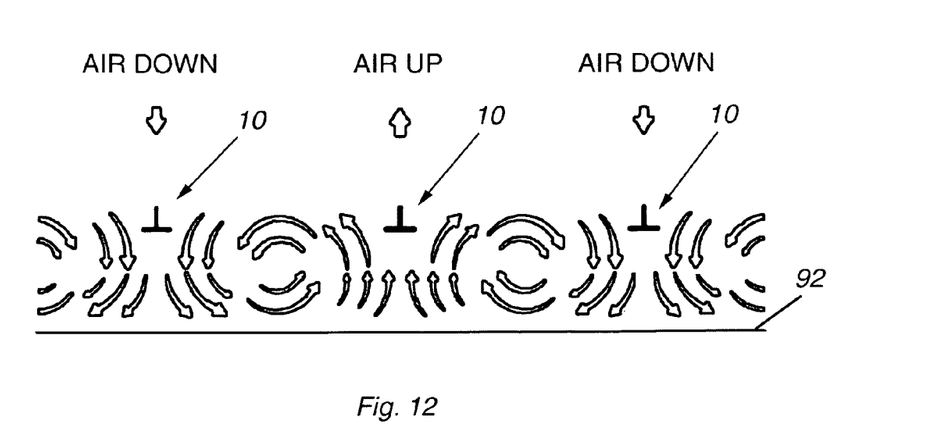
FIG. 12 is an elevation view of multiple installed fans and an alternating up-down air circulation pattern.

When an array of fans is configured with alternating downwards and upwards airflow, the results are as shown in FIG. 12 and produce a further increase in the efficiency of air circulation. This increased efficiency and optimized air movement, also possible to a lesser degree with single-direction airflow, include improved air mixing and heat destratification for more uniform air temperatures, thus enabling a building's heating and air conditioning systems to operate more efficiently. The fans 10 move air in circular patterns constrained by the floor 92, thus showing an additional benefit of increased flexibility in fan height mounting. In some circumstances, to increase airflow uniformity in buildings with large objects such as pallets of goods that may be moved around, various fans 10 in an array may be adjusted for a mixture of up and down airflow, as well as for varying fan blade pitch, not only not in a strictly alternating configuration, but with varying degrees of airflow per fan.

An alternate embodiment of the invention has fewer than 6 fan blades.

Another alternate embodiment of the invention has greater than 6 fan blades.

Yet another alternate embodiment of the invention has the fan suspended from one or more mounting shafts attached to a beam or other structural member in a building.

An additional alternate embodiment of the invention incorporates at least one spring or other passive mechanical means within the blade pitch setting mechanism to provide a return to a default blade pitch setting.

Yet another additional alternate embodiment of the invention allows the control unit to store multiple fan operation profiles including fan rotation speed and blade pitch, with the option of programming the use of different profiles at different set times. In this alternate embodiment, libraries of fan performance profiles could be entered, stored and implemented by the users to achieve air movement best matched to their own needs.

Having described herein illustrative embodiments and best mode of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. A high volume low speed fan comprising:
a plurality of radially oriented fan blades each having a tip end, a base end and a body formed along a longitudinal axis;
a rotatable shaft attached to said base end and aligned with said longitudinal axis;
said rotatable shaft terminated by an offset crank arm; said offset crank arm having a crank pin;
said fan blade being rotatable around said rotatable shaft by movement of said crank pin around said longitudinal axis thereby setting a fan blade pitch angle;
a grooved disk having an external annular groove, said crank pins captured within said annular groove;
an axial shaft axially attached to said grooved disk, said axial shaft being axially movable;
a rotatable tubular shaft radially surrounding said axial shaft;
a hub assembly attached to said tubular shaft, said hub assembly configured to engage said rotatable shafts in a radially symmetrical pattern while permitting rotation of said rotatable shafts;
a drive motor rotatably coupled via a drive assembly to said tubular shaft wherein operation of said drive motor causes rotation of said tubular shaft and said hub assembly, thereby causing radial rotation of said fan blades; and,
a position control motor coupled to said axial shaft, wherein operation of said position control motor causes axial translation of said axial shaft and said grooved disk, thereby causing uniform and simultaneous movement of said crank pins, and thereby causing uniform and simultaneous angular rotation of said fan blades to set said fan blade pitch angle.

2. A high volume low speed fan as described in claim 1, wherein for each of said fan blades said base end has a tubular blade mounting socket aligned with said longitudinal axis and said rotatable shaft is fastened into said blade mounting socket.

3. A high volume low speed fan as described in claim 1, further comprising:
at least one electronic control unit providing motor control means for parameters selected from the group including drive motor speed, drive motor startup speed profile, fan blade pitch angle, and startup fan blade pitch angle;
said electronic control unit further comprising at least one display providing information about fan operation and environmental parameters, and user control inputs for parameters including power on, fan rotational speed, fan blade pitch angle, and fan control mode;
said display and said user control inputs being located in a user-accessible portion of said electronic control unit; and,
sensing means for parameters selected from the group including drive motor speed, fan blade pitch angle, air temperature, power usage, fan wobble, and external control signals, said sensing means in communication with said electronic control unit.

4. A high volume low speed fan as described in claim 3, wherein a first fan control mode sets fan blade angle pitch for optimal performance at a user-selected rotational speed and airflow direction, said first fan control mode thereby providing improved power efficiency.

5. A high volume low speed fan as described in claim 3, wherein a second fan control mode turns on and off said fan based on specified temperature differences between a first temperature sensor located in proximity to said fan and a second temperature sensor located in proximity to said electronic control unit, said second fan control mode thereby providing efficient destratification of air layers.

6. A high volume low speed fan as described in claim 3, wherein a third fan control mode turns on and off said fan based on specified temperature differences between a first temperature sensor located in proximity to said fan and a second temperature sensor located in proximity to said electronic control unit, said third fan control mode further controlling said fan rotational speed based on the degree of difference between the output of said first temperature sensor and said second temperature sensor, said third fan control mode thereby providing an improved degree of control over air movement to effect air mixing, heat destratification and rapid cooling of the area under said fan.

7. A high volume low speed fan as described in claim 3 wherein said fan blade pitch angle is controlled to be approximately zero at startup of said drive motor and reaches a programmed final pitch angle in response to parameters communicated via said electronic control unit.

8. A high volume low speed fan as described in claim 3 wherein said control unit further comprises means for storing a calculation of maximum safe fan blade pitch angle versus drive motor speed based on programmed parameters;
said fan blade pitch angle is controlled to be approximately zero at startup of said drive motor in order to reduce startup load on said drive motor; and
said fan blade pitch angle is further controlled to reach a programmed final pitch angle in response to parameters communicated to said electronic control unit, said final pitch angle not to exceed said maximum safe fan blade pitch angle in relation to drive motor speed.

9. A high volume low speed fan as described in claim 3 wherein said control unit further comprises:
a motor drive circuit for driving said drive motor;
power electronics circuitry including a line voltage portion and a low voltage portion;
said motor drive circuit and said line voltage portion of said power electronics being located in proximity to said drive motor, thereby providing a simplified and safer wiring installation whereby only electronic connections selected from the group including low voltage, remote or networked connections, are required to communicate with said user-accessible portion of said control unit.

10. A high volume low speed fan as described in claim 1 wherein said fan blade pitch angle is within a range from at least approximately minus 20 degrees to at least approximately plus 20 degrees.

11. A high volume low speed fan as described in claim 1 wherein said fan blades are shaped and oriented to produce a conical airflow profile including both axial and radial airflow components, thereby moving air in multiple directions.

12. A high volume low speed fan as described in claim 11 wherein the radial spread of said conical airflow profile is substantially controlled by said fan blade pitch angle.

13. A high volume low speed fan as described in claim 12 wherein said fan blade shape and said fan blade pitch angle in combination allow direction of at least a portion of said airflow over an angular range of up to 360 degrees.

14. A high volume low speed fan as described in claim 11 wherein the velocity of a substantial portion of said axial airflow is controllable within a range from 0 mph to at least 10 mph.

15. A high volume low speed fan as described in claim 1 wherein said fan blade pitch angle is further controlled by passive mechanical means providing a return to a default blade pitch setting.

16. A high volume low speed fan as described in claim 1 wherein said fan blades are composed substantially of at least one nonmetallic material molded around a longitudinally oriented hollow metal core.

17. A high volume low speed fan as described in claim 16 wherein said nonmetallic material is a urethane material.

18. A high volume low speed fan as described in claim 1 wherein said body of said fan blade further comprises a middle region, said middle region being the widest portion of said fan blade; and,
said body of said fan blade tapering from said middle region towards said base end and towards said tip end.

19. A high volume low speed fan as described in claim 1 wherein said fan blades comprise in cross section a symmetrical airfoil shape whereby equal positive and negative fan blade pitch angles produce opposite but equal air flow volume and contour.

20. A high volume low speed fan as described in claim 1 wherein said fan has a low profile form factor and may be mounted to one or more beams below a roof or ceiling in a location selected from the group consisting of factories, warehouses, distribution centers, storage facilities, airplane hangars and repair buildings, auto maintenance, storage and dealerships, hotel lobbies, retail stores, malls, churches, sports facilities and gymnasiums, dairy barns, animal feed and food storage facilities, food processing centers, poultry barns, livestock facilities, horse stables and riding arenas, barns, military facilities and other large facilities.

21. A high volume low speed fan as described in claim 1 wherein a plurality of said fans may be mounted in proximity to one another whereby said conical airflow from each fan will complement and reinforce overall airflow.

22. A high volume low speed fan as described in claim 1 wherein a plurality of said fans may be mounted in proximity to one another and configured in an array with variably mixed upwards and downwards airflow to complement and reinforce overall airflow in response to changing cooling and ventilation requirements.

23. A high volume low speed fan for moving air in a building, said fan comprising:
a plurality of radially oriented fan blades each having a tip end, a base end and a body formed along a longitudinal axis;
said fan blades being composed substantially of a nonmetallic material formed around a tubular metal core and having a symmetrical airfoil shape whereby equal positive and negative fan blade pitch angles produce opposite but equal air flow volume and contour;
said fan blades tapering both towards said base end and said tip end, said fan blades being shaped and oriented to produce a conical airflow profile including both axial and radial airflow components;
said base end having a tubular blade mounting socket aligned with said longitudinal axis;
for each of said fan blades, a rotatable shaft terminated by an offset crank arm;
said offset crank arm having a crank pin;
said rotatable shaft fastened into said blade mounting socket;
said fan blade being rotatable around said rotatable shaft by movement of said crank pin around said longitudinal axis thereby setting a fan blade pitch angle in the range of minus at least approximately 20 degrees to plus at least approximately 20 degrees;
said fan blade shape and said fan blade pitch angle in combination allowing direction of at least a portion of said airflow over an angular range of up to 360 degrees;
a grooved disk having an external annular groove, said crank pins captured within said annular groove;
an axial shaft axially attached to said grooved disk, said axial shaft being axially movable;
a rotatable hollow shaft radially surrounding said axial shaft;
a hub assembly attached to said hollow shaft, said hub assembly configured to engage and at least partially enclose said rotatable shaft portions in a radially symmetrical pattern while permitting rotation of said shaft portions, said hub assembly further having a hollow cavity wherein said grooved disk is located;
a drive motor rotatably coupled via a drive assembly to said hollow shaft wherein operation of said drive motor causes rotation of said hollow shaft and said hub assembly, thereby causing radial rotation of said fan blades;
a position control motor coupled to said axial shaft;
an electronic control unit providing motor control means for parameters selected from the group including drive motor speed, drive motor startup speed profile, fan blade pitch angle, and startup fan blade pitch angle;
said electronic control unit further comprising at least one display providing information about fan operation and environmental parameters, and user control inputs for parameters including power on, fan rotational speed, fan blade pitch angle, and fan control mode;
said electronic control unit further comprising sensing means for parameters selected from the group including drive motor speed, fan blade pitch angle, air temperature, power usage, fan wobble, and external control signals, said sensing means in communication with said electronic control unit; and,
wherein operation of said position control motor causes axial translation of said axial shaft and said grooved disk, thereby causing uniform and simultaneous movement of said crank pins, thereby causing uniform and simultaneous angular rotation of said fan blades, and thereby allowing pitch angle control over the velocity of air flow and over the radial spread of said conical airflow profile to move air in multiple directions.

24. A high volume low speed fan as described in claim 23 wherein said control unit further comprises means for storing a calculation of maximum safe fan blade pitch angle versus drive motor speed based on programmed parameters;
said fan blade pitch angle is controlled to be approximately zero at startup of said drive motor in order to reduce startup load on said drive motor; and
said fan blade pitch angle is further controlled to reach a programmed final pitch angle in response to parameters communicated to said electronic control unit, said final pitch angle not to exceed said maximum safe fan blade pitch angle in relation to drive motor speed.

25. A high volume low speed fan as described in claim 23 wherein said fan has a low profile form factor and may be mounted to one or more beams below a roof or ceiling in a location selected from the group consisting of factories, warehouses, distribution centers, storage facilities, airplane hangars and repair buildings, auto maintenance, storage and dealerships, hotel lobbies, retail stores, malls, churches, sports facilities and gymnasiums, dairy barns, animal feed and food storage facilities, food processing centers, poultry barns, livestock facilities, horse stables and riding arenas, barns, military facilities and other large facilities; and, a plurality of said fans may be configured in an array with mixed upwards and downwards airflow to complement and reinforce overall airflow.

* * * * *